United States Patent
Oishi et al.

(10) Patent No.: US 6,911,158 B2
(45) Date of Patent: Jun. 28, 2005

(54) SOUND ABSORBING MATERIAL AND ITS MANUFACTURING METHOD

(75) Inventors: Tsutomu Oishi, Tokyo (JP); Yoshiya Nakamura, Tokyo (JP); Yoshizumi Tanaka, Ube (JP); Mitsuhiko Sato, Ube (JP)

(73) Assignees: Ishikawajima-Harima Heavy Industries Co., Ltd, Tokyo (JP); Ube Industries, Ltd., Yamaguchi (JP)

( * ) Notice: Subject to any disclaimer, the term of this patent is extended or adjusted under 35 U.S.C. 154(b) by 0 days.

(21) Appl. No.: 10/362,945

(22) PCT Filed: Nov. 28, 2001

(86) PCT No.: PCT/JP01/10406
§ 371 (c)(1),
(2), (4) Date: Feb. 27, 2003

(87) PCT Pub. No.: WO02/44105
PCT Pub. Date: Jun. 6, 2002

(65) Prior Publication Data
US 2003/0183799 A1 Oct. 2, 2003

(30) Foreign Application Priority Data
Nov. 29, 2000 (JP) ........................................ 2000-362242

(51) Int. Cl.[7] .............................................. C04B 38/04
(52) U.S. Cl. .............................. 252/62; 501/81; 501/82; 501/83
(58) Field of Search .............................. 252/62; 501/81, 501/83, 82; 264/44, 43

(56) References Cited

U.S. PATENT DOCUMENTS

| | | | |
|---|---|---|---|
| 4,104,077 A | * | 8/1978 | Kobayashi et al. .......... 106/672 |
| 4,404,291 A | * | 9/1983 | Kiefer et al. .................. 501/81 |
| 4,588,540 A | * | 5/1986 | Kiefer et al. .................. 264/43 |
| 4,904,291 A | * | 2/1990 | Siebers et al. ................. 65/17.5 |
| 5,219,802 A | * | 6/1993 | Hsiao et al. .................. 501/81 |
| 5,998,317 A | * | 12/1999 | Sterzel ......................... 501/80 |
| 6,113,802 A | * | 9/2000 | Penumella .................... 252/62 |
| 6,235,665 B1 | * | 5/2001 | Pickrell et al. ................. 501/9 |

FOREIGN PATENT DOCUMENTS

| | | |
|---|---|---|
| JP | 50-91505 A | 7/1975 |
| JP | 10-187163 | 7/1998 |
| JP | 10-194864 | 7/1998 |
| JP | 11-291403 A | 10/1999 |
| JP | 11-333293 A | 12/1999 |

* cited by examiner

Primary Examiner—C. Melissa Koslow
(74) Attorney, Agent, or Firm—Griffin & Szipl, P.C.

(57) ABSTRACT

The porous sound-absorbing material manufactured is light and has excellent heat resistance to be applicable to the exhaust nozzle etc. of a jet engine, can effectively absorb noise as that from a jet engine, over a wide range of frequencies, is free from variations in porosity, and provides stable performance characteristics. An essential feature thereof is the formation of a skeleton of the material, with aggregates containing voids. Thus, a porous sound-absorbing material having a skeleton of aggregates with first voids is described, wherein diameters of first voids of the aggregates are 50 μm to 100 μm, approximately, and diameters of second voids between the aggregates are 100 μm to 600 μm.

6 Claims, 7 Drawing Sheets

SOUND ABSORBING MATERIAL AND ITS MANUFACTURING METHOD

BACKGROUND OF THE INVENTION

1. Technical Field of the Invention

The present invention relates to a porous sound-absorbing material used for the exhaust nozzle and the like of a jet engine, in particular to a porous sound-absorbing material with a high sound-absorbing effect over a wide frequency range and its manufacturing method.

2. Description of the Related Art

Figure 1:
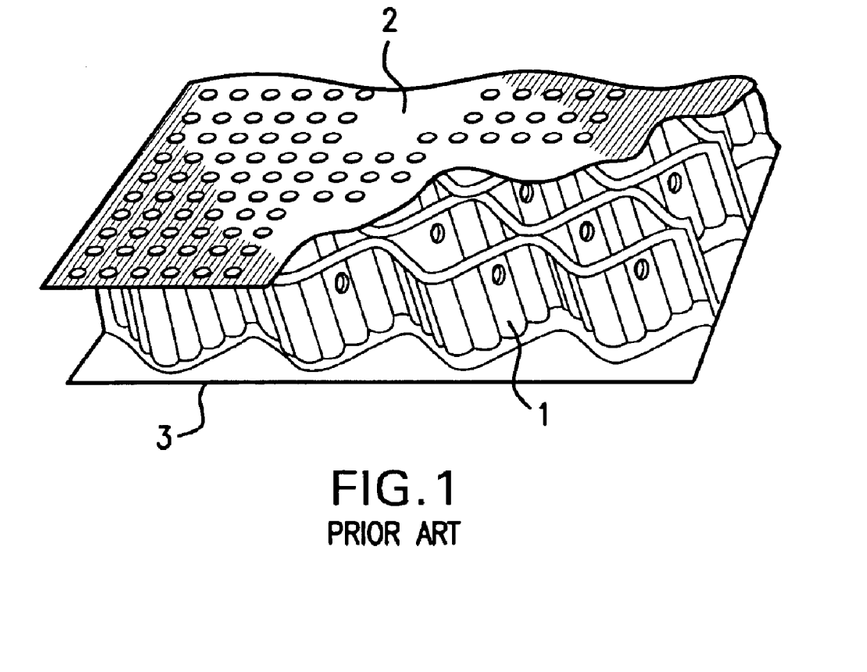
FIG. 1 is an isometric view of a conventional sound-absorbing material for high-temperature uses.

Conventional porous sound-absorbing materials used in the exhaust nozzle and the like of a jet engine are composed of a honeycomb structure as shown in FIG. 1 Partial isometric view of a sound-absorbing material for high-temperature uses.

The honeycomb sound-absorbing material shown in FIG. 1 is comprised of a honeycomb 1 made of a heat-resistant alloy, a perforated plate 2, and a rear plate 3; the material has a reactive structure like a Helmholtz resonator, and disperses sound energy using the friction on the wall surface and the kinematic energy produced when the media move.

With the honeycomb sound-absorbing material described above, there have been problems such as the perforated plate 2, inner honeycomb 1 and its rear plate 3 being overheated or greatly deformed by heat from high-temperature exhaust gas (for instance, 700~800° K or more) For example, since the perforated plate 2 is made of a stainless steel panel or an aluminum panel, the plate may be damaged or thermally deformed, and the brazed portion between the plate and honeycomb 1 may peel.

Furthermore, a sound-absorbing material with the structure described above provides only a narrow frequency range of absorbable noise, so such a wide range of noise as produced by a jet engine (for example, 1,000~3,000 Hz) cannot be absorbed satisfactorily.

Figure 2:
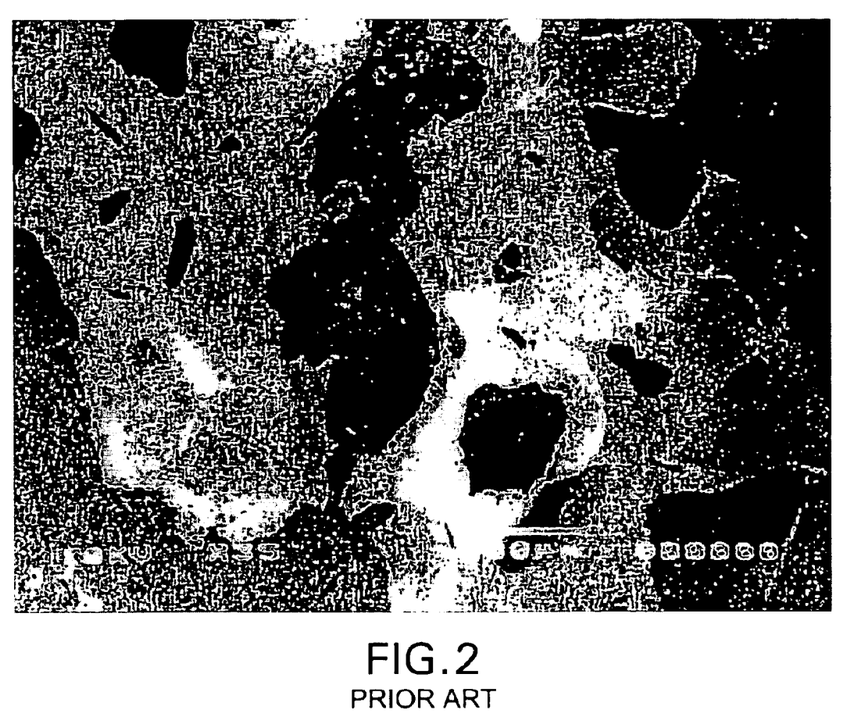
FIG. 2 is an enlarged view of a conventional foamed sound-absorbing material.

In these circumstances, foamed sound-absorbing materials that can resist heat and provide a wide sound-absorbing frequency range have been proposed. These foamed sound-absorbing materials are of a resistance type made of porous ceramics, as shown in the enlarged photo in FIG. 2 (for instance, unexamined Japanese patent publications No. 187163, 1998 and 194864, 1998).

Figure 3A:
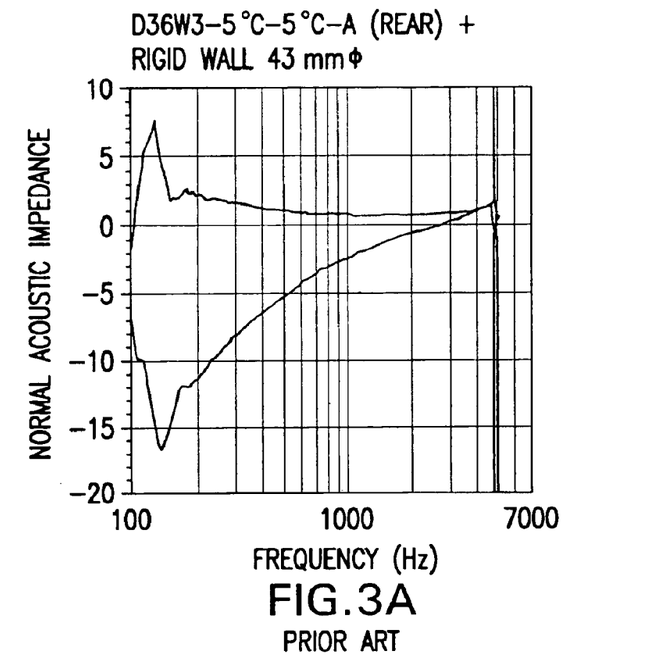
FIGS. 3A and 3B are frequency characteristic diagrams of a conventional foamed sound-absorbing material.
Figure 3B:
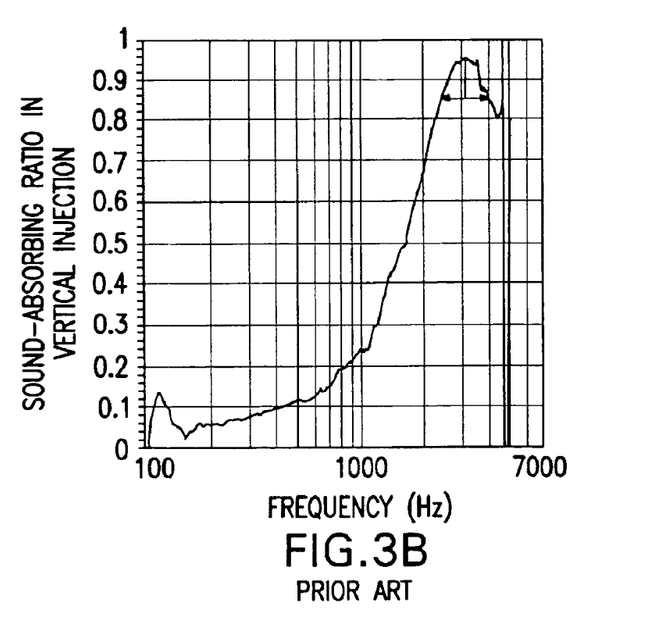

According to the above-mentioned conventional "Light-weight ceramic sound-absorbing material and its manufacturing method" of the unexamined Japanese patent publication No. 187163, 1998, both resistance to heat shocks and sound-absorbing performance of a sound-absorbing material are made high by laminating a dense layer containing ceramic fibers on the surface of a porous foamed ceramic. However, because this material is composed of multiple layers of several types of sound-absorbing material, there is a problem in that its manufacturing cost is high. Moreover, since the sound-absorbing material is manufactured by foaming a ceramic, its porosity is not constant; therefore, as shown in the frequency characteristic graphs in FIGS. 3A and 3B, there is also another problem in that the sound absorption effect cannot be easily expanded to a wide range of sound frequencies.

"Light-weight CMC sound-absorbing material and its manufacturing method" of the unexamined Japanese patent publication No. 194864, 1998 discloses a porous material made of an alumina-based ceramic containing SiC whiskers with a porosity of 80~92%, in which acoustic absorptivity is increased by adding silicon carbide fibers without changing the specific bulk density and controlling flow resistance. However, as this sound absorbing material is also manufactured by foaming a ceramic, porosity is not constant, so one problem is that a satisfactory sound-absorbing effect cannot be obtained over a wide sound frequency range.

The present invention aims to solve these problems. The objects of the present invention are to provide a porous sound-absorbing material that is light and highly resistant to heat for application to the exhaust nozzle and the like of a jet engine with a high sound absorbing effect to noises over a wide range of sound frequencies, such as those of a jet engine, and also to provide a method of manufacturing such a porous sound-absorbing material as that described above with stable performance and porosity without variations.

SUMMARY OF THE INVENTION

The present invention provides a porous sound-absorbing material with the skeleton thereof formed with aggregates with small voids.

The porosity of the invented porous sound-absorbing material is 75% to 85%, and the small voids of an aggregate are smaller than the large voids between aggregates.

More explicitly, the diameters of small voids of aggregate are 50 $\mu$m to 100 $\mu$m, approximately, and the diameters of large voids between the aforementioned aggregates are about 100 $\mu$m to 600 $\mu$m.

According to the composition of the present invention, as described above, the sound-absorbing material is composed of porous ceramics with porosities of 75% to 85%, so the material retains the strength required of a sound-absorbing material, while maintaining the prescribed sound absorbing effect. In addition, the material can highly efficiently absorb noises over a wide range of sound frequencies, such as those from a jet engine, since the material contains an enormous number of large and small voids; in which a plurality of capsule-like large voids with diameters of approximately 100 $\mu$m to 600 $\mu$m, can communicate with each other through chain-like aggregates, and also there are many small voids with diameters of about 50 $\mu$m to 100 $\mu$m, which are smaller than the diameters of capsule-like large voids, in each aggregate.

The present invention, in particular, offers complicated sound passages for noises transmitted inside the porous sound-absorbing material, by means of capsule-like large voids between chain-like aggregates and many other small voids formed in these aggregates themselves, so the apparent sound velocity in the sound absorbing material is changed, location by location, so that noise over a wide frequency range can be absorbed efficiently. In addition, when sound energy is transmitted through these large and small voids, vibrations are created and they produce sound resistance; however, since the number of passages of noises through both large and small voids is sharply increased, the overall resistance becomes large.

According to the manufacturing method of the present invention, provided is a method of manufacturing the porous sound-absorbing material, with the first process in which a raw material containing ceramic grains and a void forming material is formed into a prescribed shape, and a second process provided after the first process, in which the above-mentioned void forming material is removed.

The aforementioned ceramic grains are composed of glass-based ceramics, and the above-mentioned void-forming material is an activated carbon material or carbon grains.

In the first process of the manufacturing method of the present invention, mixed raw grains are poured into a mold and sintered or baked until solid; at that time, when required, an intermediate lid may be used to pressurize the raw grains to have an even and rigid porous body. In such a case, since oxygen is prevented from entering the raw grains through gaps in the mold and the intermediate lid even at a sintering or baking temperature, either carbon grains or an activated carbon material can be used as the void-forming material. At that time, the volumes of carbon grains and activated carbon material do not decrease to such a degree that the diameters of voids are affected significantly.

The aforementioned manufacturing method produces a portion of the large capsule-like voids by removing the mixed void forming material by sintering and the like, which differs from conventional methods whereby ceramics are foamed; therefore, a porous sound-absorbing material with a constant porosity can be fabricated. In addition, according to the invented manufacturing method, porous sound-absorbing material with large voids of a prescribed shape and size can be easily manufactured. Consequently, the porous sound-absorbing material can be easily manufactured according to a particular purpose as a sound-absorbing material, to have preferred porosity and high sound absorbing effect over a wide frequency range.

DESCRIPTION OF THE PREFERRED EMBODIMENTS

Preferred embodiments of the present invention are described referring to the drawings. In each drawing, the same components are identified with the same numbers, and no duplicate description is given.

Figure 4:
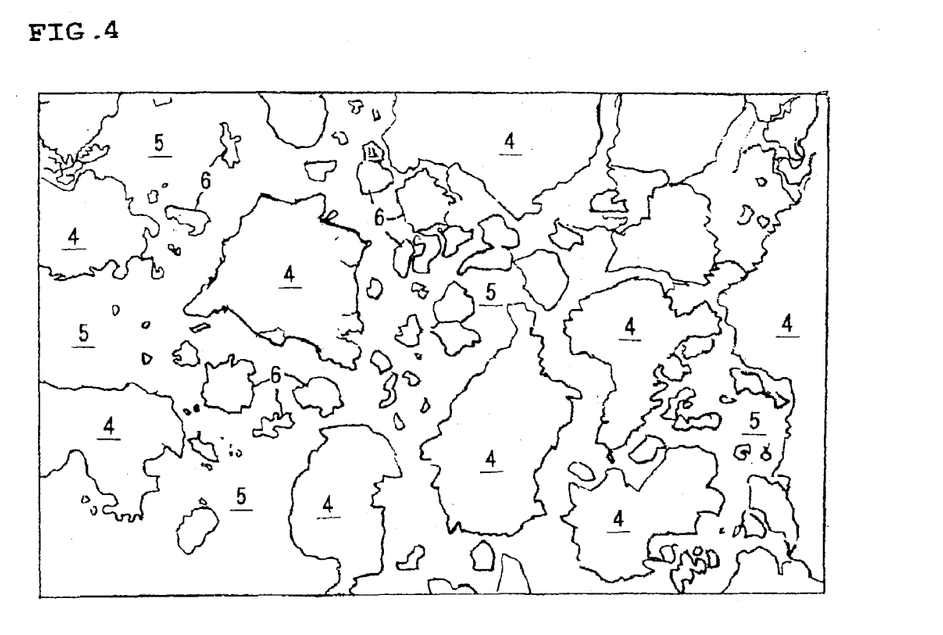
FIG. 4 is a conceptual view showing a porous sound-absorbing material according to the present invention.
Figure 5:
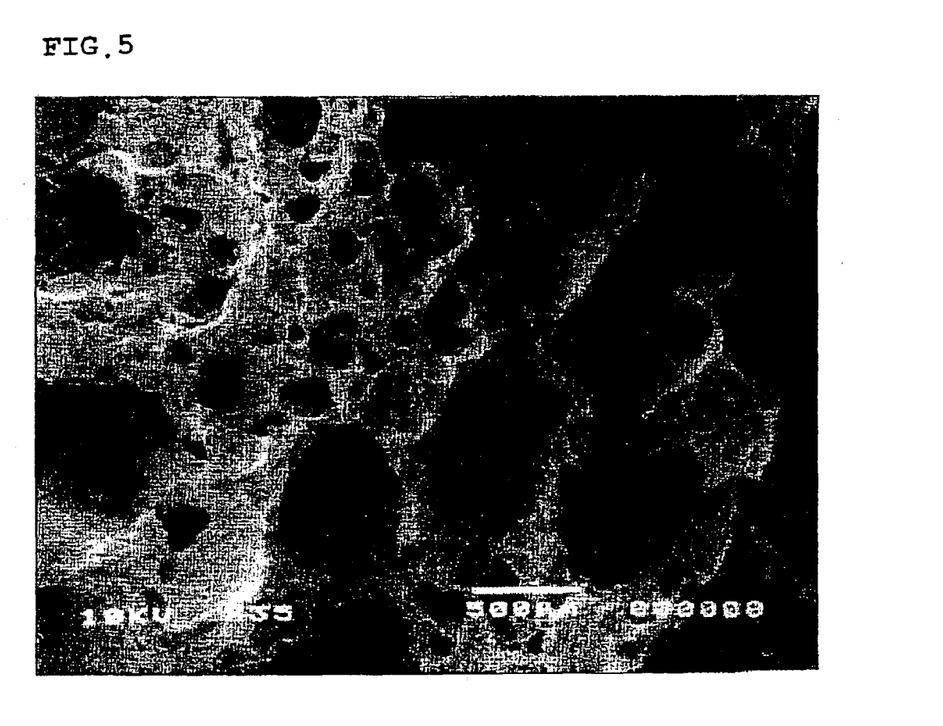
FIG. 5 is an enlarged view that shows the status of an embodiment of the porous sound-absorbing material according to the present invention.
Figure 6A:
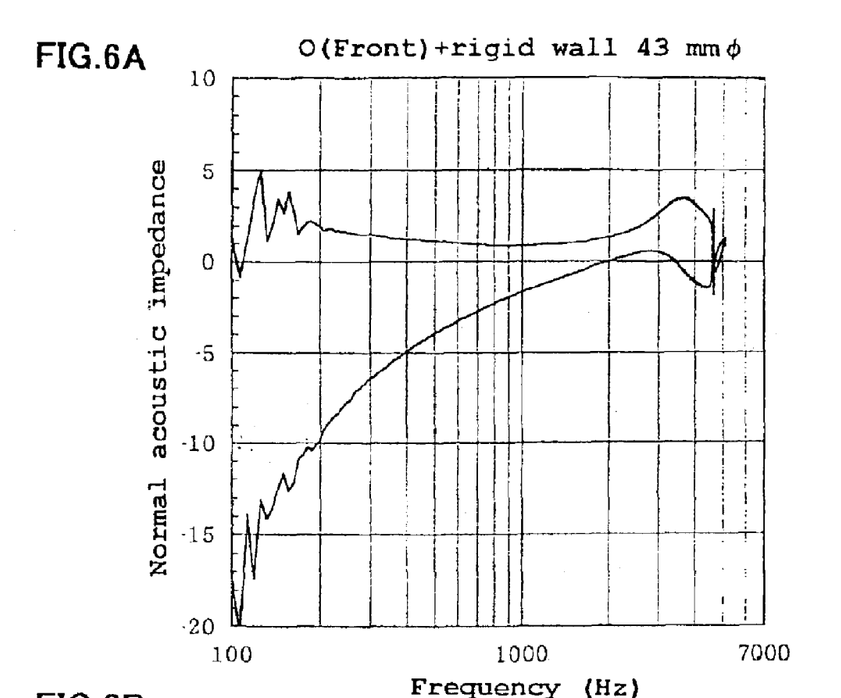
FIGS. 6A and 6B are frequency characteristic diagrams of the porous sound-absorbing material shown in FIG. 5.
Figure 6B:
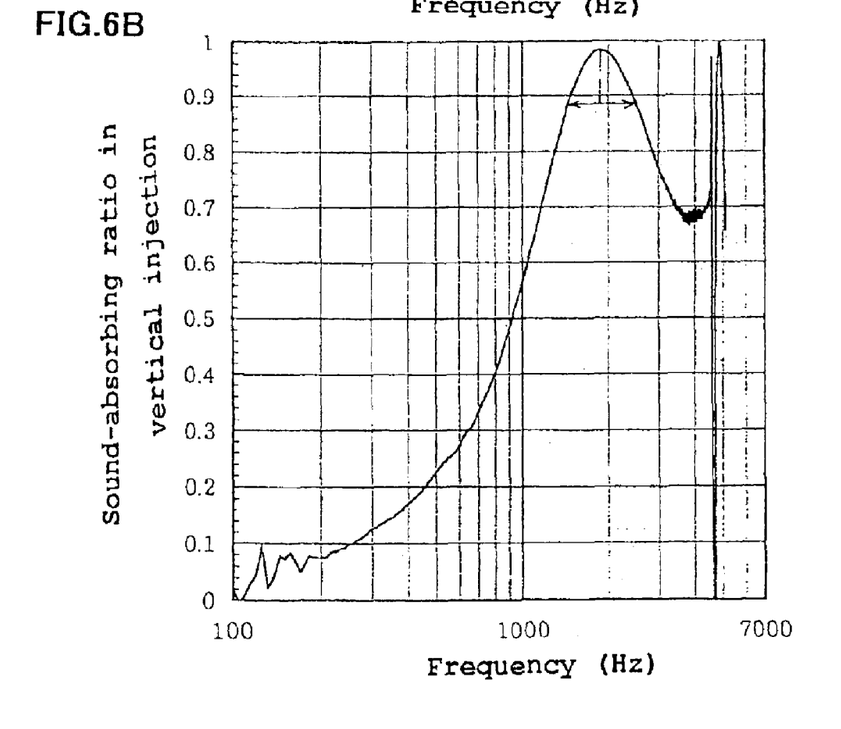
Figure 7:
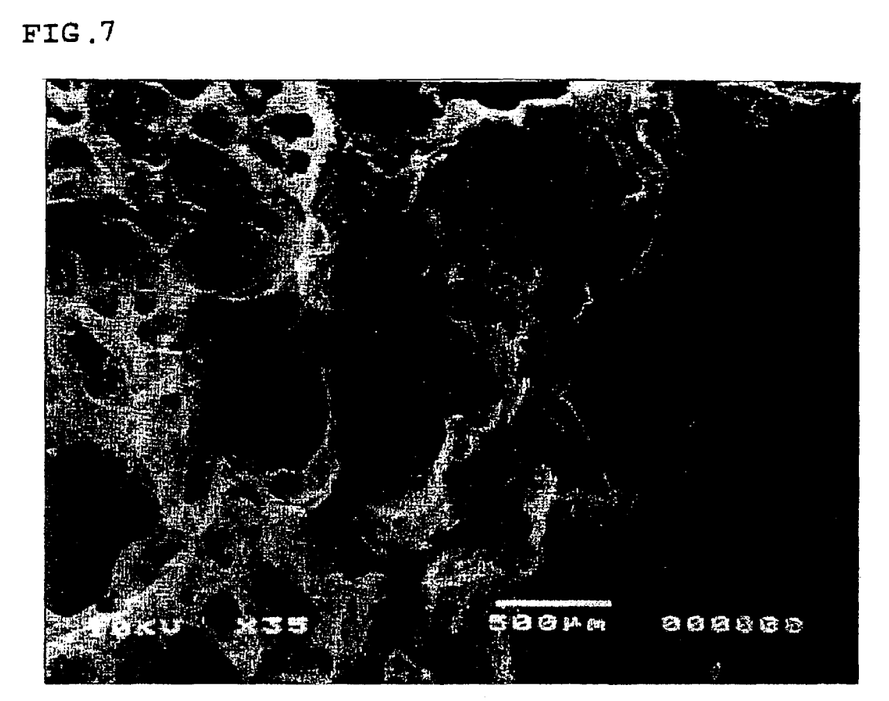
FIG. 7 is an enlarged view showing the status of implementation of another embodiment of the porous sound-absorbing material according to the present invention.
Figure 8A:
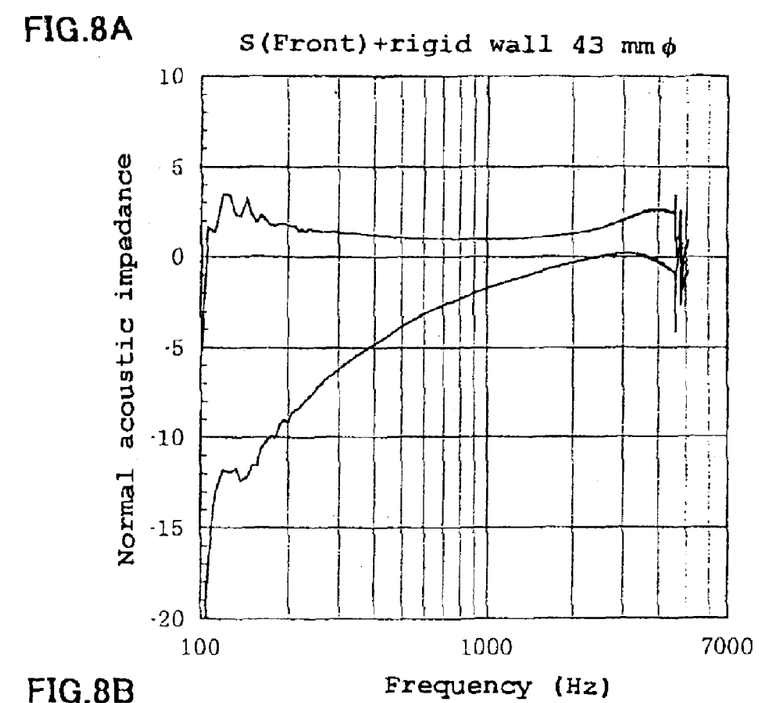
FIGS. 8A and 8B are frequency characteristic diagrams of the porous sound-absorbing material shown in FIG. 7.
Figure 8B:
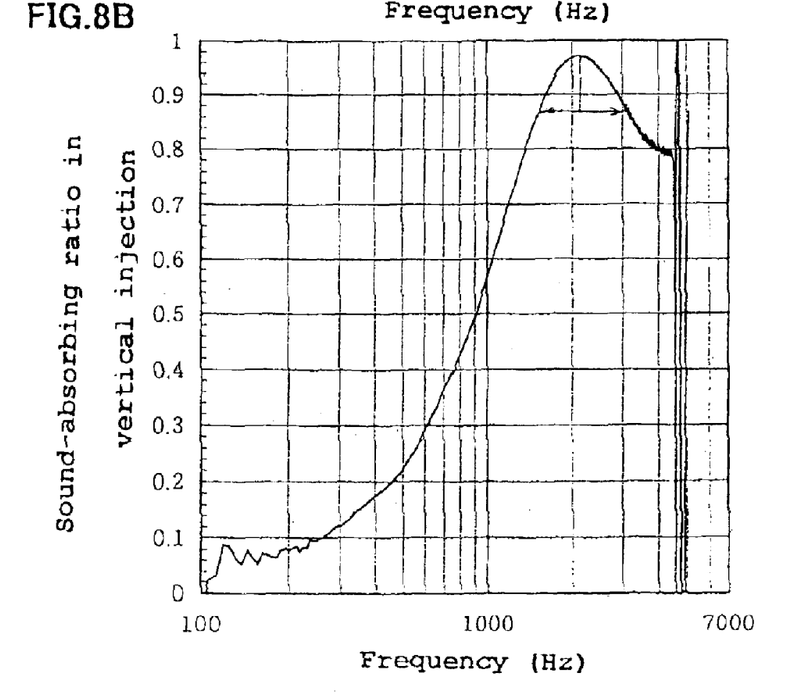

FIG. 4 is a mosaic view of the porous sound-absorbing material according to the present invention. FIG. 5 is an enlarged photo that shows the status of an embodiment of the porous sound absorbing material according to the present invention. FIGS. 6A and 6B are frequency characteristic graphs for the porous sound-absorbing material in FIG. 5 and FIG. 7 is an enlarged photo showing the status of another embodiment of the porous sound-absorbing material disclosed in the present invention. FIGS. 8A and 8B are frequency characteristic diagrams of the porous sound-absorbing material shown in FIG. 7.

The porous sound-absorbing material of the present invention is a sound-absorbing material made of a raw material of porous ceramics with a porosity of 75% to 85%. The reason for selecting a porosity of 75% to 85% is to maintain the toughness of the material to be used in a high-temperature environment, while retaining the prescribed sound-absorbing effect described later.

An example of porous ceramics according to the present invention is glass-based ceramics. The glass-based ceramics used have a composition such as BMAS ($BaO$—$MgO$—$Al_2O_3$—$SiO_2$) and MAS bases ($MgO$—$Al_2O_3$—$SiO_2$ or $MgO$—$Al_2O_3$—$SiO_2$—$B_2O_3$—$ZnO$ based glass).

As shown in FIG. 4 these porous ceramics contain a tremendous number of capsule-like voids 4 with diameters of 100 $\mu$m to 600 $\mu$m, and are constituted with one-, two- or three-dimensional chain-like aggregates 5 in which voids 4 communicate with each other one-, two-, or three-dimensionally. For instance, when the porous sound-absorbing material according to the present invention is used as a sound-absorbing material for noise over a wide frequency range, such as those from a jet engine, voids 4 formed by these aggregates 5 are preferably formed to have a diameter of about 500 $\mu$m.

In addition, according to the present invention, these aggregates 5 are also provided with a large number of voids 6 with diameters of 50 $\mu$m to 100 $\mu$m. The number of these voids 6 is several times that of the capsule-like voids 5 described above. As such, voids 6 formed in aggregates 5 with diameters of 50 $\mu$m to 100 $\mu$m work in conjunction with the above-mentioned capsule-like voids 4 with diameters of 100 $\mu$m to 600 $\mu$m; passages of noise transmitted inside the porous sound-absorbing material are complicated by capsule-like voids 4 that communicate with each other one-, two-, or three-dimensionally in chain-like aggregates 5, and small voids 6 formed in these aggregates 5 themselves. Such a sound-absorbing structure as that described above locally varies the apparent sound velocity in the sound-absorbing material, and can enhance the sound-absorbing effect for noise over a wide frequency range, such as from a jet engine.

When noise passes through these large and small voids 4 and 6 of the porous sound-absorbing material according to the present invention, such as illustrated in FIG. 4, acoustic resistance is produced by vibrations produced therein. However, since the number of passages through voids 4, 6 is greatly increased, the overall resistance is also increased. Therefore, the porous sound-absorbing material can provide a high sound-absorbing effect. As shown in the frequency characteristic diagrams of the porous sound-absorbing material shown in FIGS. 6A and 6B and FIGS. 8A and 8B, sound-absorbing effects for noise over a wide frequency range are higher than those shown in the frequency characteristic diagrams of the conventional foamed sound-absorbing material in FIGS. 3A and 3B.

Next, the method of manufacturing the porous sound-absorbing material according to the present invention is described.

First, the aforementioned glass- or alumina-based ceramics grains are mixed with a dispersant, organic binder, and the like to form an ordinary raw material; then the raw material is mixed with a void forming material to form a raw slurry; or ceramic grains are uniformly mixed with the void-forming material in a dry system to form mixed grains. According to the manufacturing method of the present invention, the mixed void-forming material is removed by sintering and the like, thereby not only can the porosity of 75% to 85% be achieved, but also voids 4 can be precisely formed according to preferred shape and size.

These raw slurry or dry mixed grains are poured into a mold, dehydrated and dried, sintered to form a skeleton, and removed from the mold (first process). In the first process, the raw aggregate material is sintered or baked, and the skeleton is given a self-standing toughness. The mold is shaped according to a prescribed form for a particular purpose of absorbing sound.

Finally, the void-forming material is removed by oxidation, solvent extraction, and the like (second process). The void-forming material used herein constitutes a portion of the voids 4 in the aggregates 5, and the shapes thereof can be made to capsules or balloons. In practice, the void-forming material can be activated carbon, for example. In the first process, when an intermediate lid is used to place a load on the raw grains, the entry of oxygen from gaps between the mold and the intermediate lid is prevented, so granular carbon or activated carbon can also be used as the void-forming material. At that time, the degree of volumetric decrement in the granular carbon or activated carbon is not so large as to affect the diameters of voids.

To form voids, the void-forming material must be removed. Any residue of the void-forming material, after sintering or baking, adversely affects sound-absorbing characteristics. With few residues, there are no particular problems. With many residues, sound-absorbing characteristics deteriorate. In particular, if residues exceed 10 weight %, sound-absorbing characteristics become remarkably low. If less than 10 weight %, no problems occur. However, considering the operating environment of the sound-absorbing material, its content should preferably be not more than 1 weight %.

is 10 weight % or less. For example, NaCl, NaF, KCl, and KF can be used.

The porosities of the porous sound-absorbing material according to the present invention can be varied from 75% to 85% through a manufacturing process. These porosities can be adjusted by controlling basic raw materials such as ceramic grains, dispersant, and organic binder, and the mixing ratio of activated carbon as a void-forming material. The porosity is calculated by, for instance, the following formula 1.

$$\text{Porosity}: \phi = \left(1 - \frac{\text{Bulk density of porous material}}{\text{Density of raw material (dense body)}}\right) \times 100 \, (\%) \quad \text{[Formula 1]}$$

Diameters of voids 4 of the porous sound-absorbing material according to the present invention, such as illustrated in FIG. 4, can also be adjusted to the same porosity as shown in the following Table 1 (Porous ceramics Test Piece manufacturing items); for instance, the mean diameter of activated carbon grains is changed between 100~150 $\mu$m and 550~600 $\mu$m and the diameters of the void can be changed while the same porosities.

A large number of voids 6, formed in aggregates 5, are portions such that when ceramics are sintered, moisture, fine void-forming material grains, and the like originally contained in the raw slurry or dry mixed grains have been vaporized.

TABLE 1

| Material | Composition | Voids Foaming Material | Mean Diameter | Sound absoption test piece | | Porosity Strength test piece | |
|---|---|---|---|---|---|---|---|
| BMAS | BaO—MgO—Al$_2$O$_3$—SiO$_2$ based ceramics ($\alpha = 2.0 \times 10^{-6}/^\circ$ C.) | Spherical carbon | 150 $\mu$m | 75% | 80% | — | — |
| | | Spherical carbon | 600 $\mu$m | 75% | 80% | 85% | 85% |
| | | Granular carbon | 100 $\mu$m | 75% | 80% | — | — |
| | | Granular carbon | 550 $\mu$m | 75% | 80% | 85% | 85% |
| MAS | MgO—Al$_2$O$_3$SiO$_2$ based ceramics ($\alpha = 5.4 \times 10^{-6}/^\circ$ C.) | Spherical carbon | 150 $\mu$m | — | — | — | — |
| | | Spherical carbon | 600 $\mu$m | — | — | 85% | 85% |
| | | Granular carbon | 100 $\mu$m | — | — | — | — |
| | | Granular carbon | 550 $\mu$m | — | — | 85% | 85% |
| MAS group | MgO—Al$_2$O$_3$—SiO$_2$—B$_2$O$_3$—ZnO grass based ceramics ($\alpha = 5.0 \times 10^{-6}/^\circ$ C.) | Spherical carbon | 150 $\mu$m | — | — | — | — |
| | | Spherical carbon | 600 $\mu$m | — | — | 85% | 85% |
| | | Granular carbon | 100 $\mu$m | — | — | — | — |
| | | Granular carbon | 550 $\mu$m | — | — | 85% | 85% |
| Alumina | Al$_2$O$_3$( +AlPO4 + MgO) ($\alpha = 6\sim 7 \times 10^{-6}/^\circ$ C.) | Spherical carbon | 150 $\mu$m | — | — | — | — |
| | | Spherical carbon | 600 $\mu$m | — | — | 85% | 85% |
| | | Granular carbon | 100 $\mu$m | — | — | — | — |
| | | Granular carbon | 550 $\mu$m | — | — | 85% | 85% |

When manufacturing the void-forming material according to the present invention, the intermediate lid is used in the first process, to place a load on the low grains. At that time, the void-forming material is to have an oxygen resistance such that the volume of the material slightly decreases, and a ratio of residues at 10 weight % or less will be used for second process. For instance, carbon grains and activated carbon can be used.

Other characteristics required of the void-forming material include that in the first process, the volume of the material does not substantially decrease, the coefficient of thermal expansion thereof is greater than those of the aggregates, and in the second process, the ratio of residues The diameters of these fine voids 6 can be adjusted during manufacture to have a prescribed size by controlling the mixing ratio of glass or alumina-based ceramics grains, dispersant, organic binder, void forming material, etc.

The porous sound-absorbing material sintered can also be cut into a required shape, for application in the form prescribed for the exhaust nozzle etc. of a jet engine.

[Embodiment 1]

Practical embodiments 1 and 2 of the manufacturing method according to the present invention are described next.

In embodiment 1, aggregates of raw grains, that is, BMAS 100 g and a void-forming material of 60 g of activated carbon with a mean grain diameter of 100 $\mu$m were mixed uniformly in a dry system, then poured into an alumina mold of 9 cm×9 cm×4 cm, and the mold was closed with an intermediate alumina lid of 8.5 cm×8.5 cm×1.0 cm. In this state, BMAS was crystallized by sintering the mixture in the atmosphere at 1,300° C. for 2 hours. The workpiece was then removed from the mold, and baked once at 900° C. for 10 hours to remove the activated carbon. Further, the baked body was turned upside down, and baked for a second time at 900° C. for 10 hours. As a result, the porosity of the porous body was 80%.

[Embodiment 2]

In embodiment 2, aggregates of raw grains of BMAS 100 g, and a void-forming material of NaF 360 g with a mean grain diameter of 600 $\mu$m were evenly mixed in a dry system, poured into a mold made of aluminum, 9 cm×9 cm×4 cm, and the mold was closed with an intermediate alumina lid of 8.5 cm×8.5 cm×1.0 cm. In this state, the workpiece was sintered in the atmosphere at 1,300° C. for 2 hours, and BMAS was crystallized. Thereafter, the work was removed from the mold, rinsed with water and NaF was removed. The porosity of the porous body obtained at that time was 85%.

However, the present invention should not be restricted only to the status of the above-mentioned applications and embodiments that have been described with regard to the implementation status of the porous sound-absorbing materials with porosities of 75% to 85%. Conversely, these porosities are not limited, but can also be made lower than 75% or higher than 85%, depending on purposes of using a sound-absorbing material or types of ceramics. Therefore, it should be understood that of course many modifications are possible as far as the claims of the present invention are not exceeded.

POSSIBLE INDUSTRIAL APPLICATIONS

The porous sound-absorbing material of the present invention is a material composed of porous ceramics with a predetermined porosity, as described above, so the material has the prescribed bending strength to meet the requirements of the sound-absorbing material, while maintaining a specified sound-absorbing effect. In addition, since the material is composed of chain-like aggregates containing voids with predetermined sizes, in which many other voids with diameters smaller than the diameters of the aforementioned voids are also formed, the material can be used advantageously to absorb noises over a wide frequency range, such as those produced by a jet engine.

According to the present invention, the passages of noises transmitted inside the porous sound absorbing material are made complicated by capsule-like voids in chain-like aggregates and voids formed in each aggregate, so the apparent sound velocity in the sound-absorbing material is changed locally, while improving the efficiency of absorbing noises over a wide frequency range. Also, when noise passes these large and small voids, acoustic resistance is created due to the material vibrating, however, because the number of passages through the voids is greatly increased, the overall acoustic resistance is increased.

Furthermore, according to the method of manufacturing the porous sound-absorbing material based on the present invention provides for the easy manufacture of the porous sound-absorbing material with voids having preferred shapes and sizes, by removing the mixed void-forming material through baking and the like. Unlike a conventional manufacturing method in which ceramics are foamed, the present invention offers a stable method of manufacturing the porous sound-absorbing material with a predetermined porosity, therefore, the manufacturing method according to the present invention provides excellent advantages in practice, such as easy manufacture of the porous sound-absorbing material with a high sound-absorbing effect in a wide frequency range.

What is claimed is:

1. A porous sound-absorbing material comprising a skeleton of aggregates with first voids and second voids, wherein diameters of first voids of the aggregates are 50 $\mu$m to 100 $\mu$m, approximately, and diameters of second voids between the aggregates are 100 $\mu$m to 600 $\mu$m.

2. The porous sound-absorbing material specified in claim 1, in which the porosity of the porous sound-absorbing material is 75% to 85%.

3. The porous sound-absorbing material specified in claim 1, in which voids of said aggregates are smaller than voids between the aggregates.

4. A method of manufacturing a sound-absorbing material, comprising:

a first process wherein a raw material containing at least ceramic grains and a void-forming material is formed into a predetermined shape, wherein the ceramic grains comprise glass-based ceramics, said void-forming material comprises activated carbon or carbon grains, and an intermediate lid is used to place a load on the ceramic grains; and a second process wherein said void forming material is removed.

5. The porous sound-absorbing material specified in claim 2, in which voids of said aggregates are smaller than voids between the aggregates.

6. A method of manufacturing a sound-absorbing material, comprising the steps of:

forming a raw material containing at least ceramic grains and a void-forming material into a predetermined shape, wherein the ceramic grains comprise glass-based ceramics, and the void-forming material comprises activated carbon or carbon grains; and removing the void forming material, wherein when the void forming material is removed, first voids form in a skeleton of aggregates of the ceramic grains and second voids form between the aggregates, wherein diameters of first voids of the aggregates are 50 $\mu$m to 100 $\mu$m, approximately, and diameters of second voids between the aggregates are 100 $\mu$m to 600 $\mu$m.

* * * * *